US010297213B2

(12) United States Patent
Du

(10) Patent No.: US 10,297,213 B2
(45) Date of Patent: May 21, 2019

(54) ARRAY SUBSTRATE WITH DATA LINE SHARING STRUCTURE

(71) Applicant: SHENZHEN CHINA STAR OPTOELECTRONICS TECHNOLOGY CO., LTD., Shenzhen (CN)

(72) Inventor: Peng Du, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/906,352

(22) PCT Filed: Dec. 30, 2015

(86) PCT No.: PCT/CN2015/099710
§ 371 (c)(1),
(2) Date: Jan. 20, 2016

(87) PCT Pub. No.: WO2017/088268
PCT Pub. Date: Jun. 1, 2017

(65) Prior Publication Data
US 2018/0261169 A1 Sep. 13, 2018

(30) Foreign Application Priority Data
Nov. 26, 2015 (CN) .......................... 2015 1 0836433

(51) Int. Cl.
G09G 3/36 (2006.01)
G02F 1/1362 (2006.01)

(52) U.S. Cl.
CPC ......... *G09G 3/3607* (2013.01); *G09G 3/3614* (2013.01); *G02F 1/136286* (2013.01);
(Continued)

(58) Field of Classification Search
CPC ..................................................... G09G 3/3607
(Continued)

(56) References Cited

U.S. PATENT DOCUMENTS

2012/0162165 A1* 6/2012 Lee ........................ G09G 3/006
345/206
2014/0125647 A1 5/2014 Shin et al.
(Continued)

FOREIGN PATENT DOCUMENTS

CN 103809313 A 5/2014
CN 104143307 A 11/2014
(Continued)

Primary Examiner — Shaheda A Abdin
(74) Attorney, Agent, or Firm — Mark M. Friedman

(57) ABSTRACT

An array substrate with a data line sharing structure is described. The array substrate comprises a source driver; a plurality of scan lines for receiving a scan signal wherein the scan lines comprise a plurality of odd scan lines and even scan lines; and a plurality of data lines for correspondingly receiving a data signal of the source driver wherein the data lines comprise a plurality of odd data lines and even data lines which are sequentially arranged; wherein the scan lines and the data lines are insulatedly interlaced in an array, each pixel region comprises a data line and at least two scan lines, each pixel region is composed of a plurality of sub-pixels with different color types correspondingly, and the drive polarities of the sub-pixels with the same color types in different pixel regions comprises a positive polarity and a negative polarity based on the data signal.

9 Claims, 6 Drawing Sheets

(52) U.S. Cl.
CPC ............... *G09G 2300/0426* (2013.01); *G09G 2300/0452* (2013.01); *G09G 2300/0823* (2013.01); *G09G 2310/0213* (2013.01)

(58) Field of Classification Search
USPC ........................................................ 345/206
See application file for complete search history.

(56) References Cited

U.S. PATENT DOCUMENTS

| | | | |
|---|---|---|---|
| 2015/0187293 A1* | 7/2015 | Yoo ..................... | G09G 3/3607 345/694 |
| 2015/0206491 A1 | 7/2015 | Cho | |
| 2015/0379920 A1 | 12/2015 | Yang | |
| 2015/0379947 A1* | 12/2015 | Sang ..................... | G09G 3/3614 349/37 |
| 2016/0247822 A1 | 8/2016 | Chen et al. | |
| 2016/0275888 A1 | 9/2016 | Chen et al. | |

FOREIGN PATENT DOCUMENTS

| | | |
|---|---|---|
| CN | 104267519 A | 1/2015 |
| CN | 104280962 A | 1/2015 |

* cited by examiner

ARRAY SUBSTRATE WITH DATA LINE SHARING STRUCTURE

BACKGROUND OF THE INVENTION

Field of Invention

The present invention relates to a technical field of a substrate, and more particularly to an array substrate with a data line sharing structure used in a liquid crystal display (LCD) to solve the problems of blinking and uneven color-mixed phenomena, which are caused by the drive polarity inversion of the sub-pixels.

Description of Prior Art

Since the LCD is provided with the features of low radiation, small size and low power consumption for consumers, therefore, the conventional display unit with cathode ray tube is increasingly replaced by the LCD. An LCD panel is widely used in communication products including a notebook computer, a personal digital assistant (PDA), a flat panel television and mobile phone.

Conventionally, a manufacturing cost reduction is a critical issue during the LCD's manufacturing procedure. A data line sharing (DLS) mechanism is commonly used wherein the number of gate lines is doubled and the number of data lines is halved to diminish the amount of source driver and thus reduce the costs. Taking an example of display panel made of four primary colors (WRGB), the sub-pixels with both white color and blue color are a drive polarity, e.g. positive polarity, and the sub-pixels with both green color and red color are an opposite drive polarity, e.g. negative polarity, in the whole display panel in a display moment of the same display frame. However, in the next display moment of the following display frame, all the drive polarities of the sub-pixels are inverted, which results in the blinking phenomenon of the display panel.

However, if the DLS mechanism is used, the amount of source driver is reduced, the resistance or impedance of the fanout wiring in the lateral sides of source driver is increased. Thus, when the LCD is driven by such higher impedance difference to cause the display mixed color, the color deviation in the two lateral fanout sides of the LCD occurs. Specifically, the resistance or impedance of the fanout wiring in the lateral sides of source driver is greater than that in the central portion of the display panel so that the resistance/capacitance (RC) delay becomes larger. For example, the charging status of the first sub-pixel in the lateral sides and the charging status of the second sub-pixel in the lateral sides are better, thereby resulting in color deviation. Similarly, the charging statuses of the first and second sub-pixels in the central portion of the display panel have the same situation of color deviation. The display quality near the fanout positions of the source driver is downgraded. Consequently, there is a need to develop a novel array substrate to solve the problems of the conventional technique.

SUMMARY OF THE INVENTION

Therefore, one objective of the present invention is to provide an array substrate with a data line sharing structure used in a liquid crystal display (LCD) to reduce the manufacturing cost of the LCD. The present invention employs the wiring layout within the pixels of the display panel to effectively solve the difference of the charging status between the sub-pixels with different color types for improving the display quality and preventing the blinking and uneven color-mixed phenomena, which are caused by the drive polarity inversion of the sub-pixels.

Based on the above objective, the present invention sets forth an array substrate with a data line sharing structure used in a liquid crystal display (LCD) wherein the array substrate connected to a gate driver. The array substrate comprises a source driver; a plurality of scan lines electrically coupled to the source driver for correspondingly receiving a scan signal of the scan driver wherein the scan lines comprise a plurality of odd scan lines and a plurality of even scan lines which are sequentially arranged; and a plurality of data lines electrically coupled to the source driver for correspondingly receiving a data signal of the source driver wherein the data lines comprise a plurality of odd data lines and a plurality of even data lines which are sequentially arranged; wherein the scan lines and the data lines are insulatedly interlaced in an array with a column and row arrangement to form a plurality of pixel regions, each pixel region comprises a data line and at least two scan lines, each pixel region is composed of a plurality of sub-pixels with different color types correspondingly, and the drive polarities of the sub-pixels with the same color types, which are disposed in different pixel regions, comprises a positive polarity and a negative polarity based on the data signal.

In one embodiment, when one pixel region in an odd data line corresponds to another pixel region in an even data line, which are triggered by the same scan lines, the charging sequence of the sub-pixels of the one pixel region in the odd data line is different from that of the sub-pixels of the another pixel region of in the even data line.

In one embodiment, a charging sequence of the sub-pixels of one pixel region in one data line is different from the charging sequence of the sub-pixels of another pixel region adjacent to the one pixel region in the one data line.

In one embodiment, each pixel region is composed of two sub-pixels with different color types respectively.

In one embodiment, the two sub-pixels with different color types comprise a pair of white sub-pixel and a blue sub-pixel or a pair of green sub-pixel and red sub-pixel.

In one embodiment, when the odd data line and the even data line are triggered by a plurality of identical scan lines, the drive polarity of the pixel region in the odd data line is the same as that of the pixel region in the even data line.

In one embodiment, when the odd data line and the even data line are triggered by a plurality of identical scan lines, the drive polarity of the pixel region in the odd data line is opposite to that of the pixel region in the even data line.

In one embodiment, the pixel region comprises four sub-pixels with different color types which are composed of a white sub-pixel, a blue sub-pixel, a green sub-pixel and a red sub-pixel respectively.

In one embodiment, when the odd data line and the even data line are triggered by a plurality of identical scan lines, the drive polarity of the pixel region in the odd data line is opposite to that of the pixel region in the even data line.

DETAILED DESCRIPTION OF THE PREFERRED EMBODIMENTS

Figure 1A:
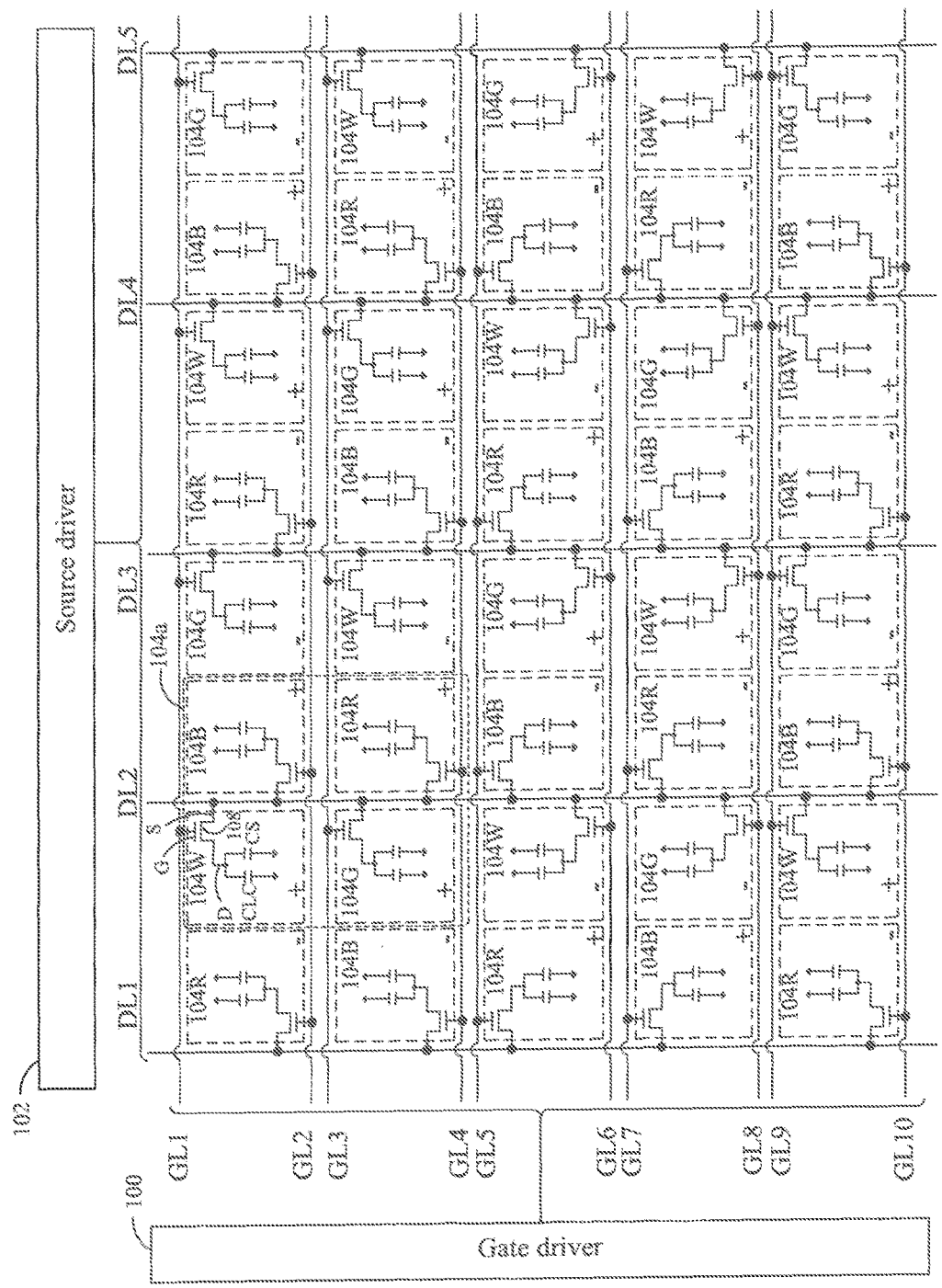
FIG. 1A is a schematic circuit of an array substrate of an LCD according to a first embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Figure 1B:
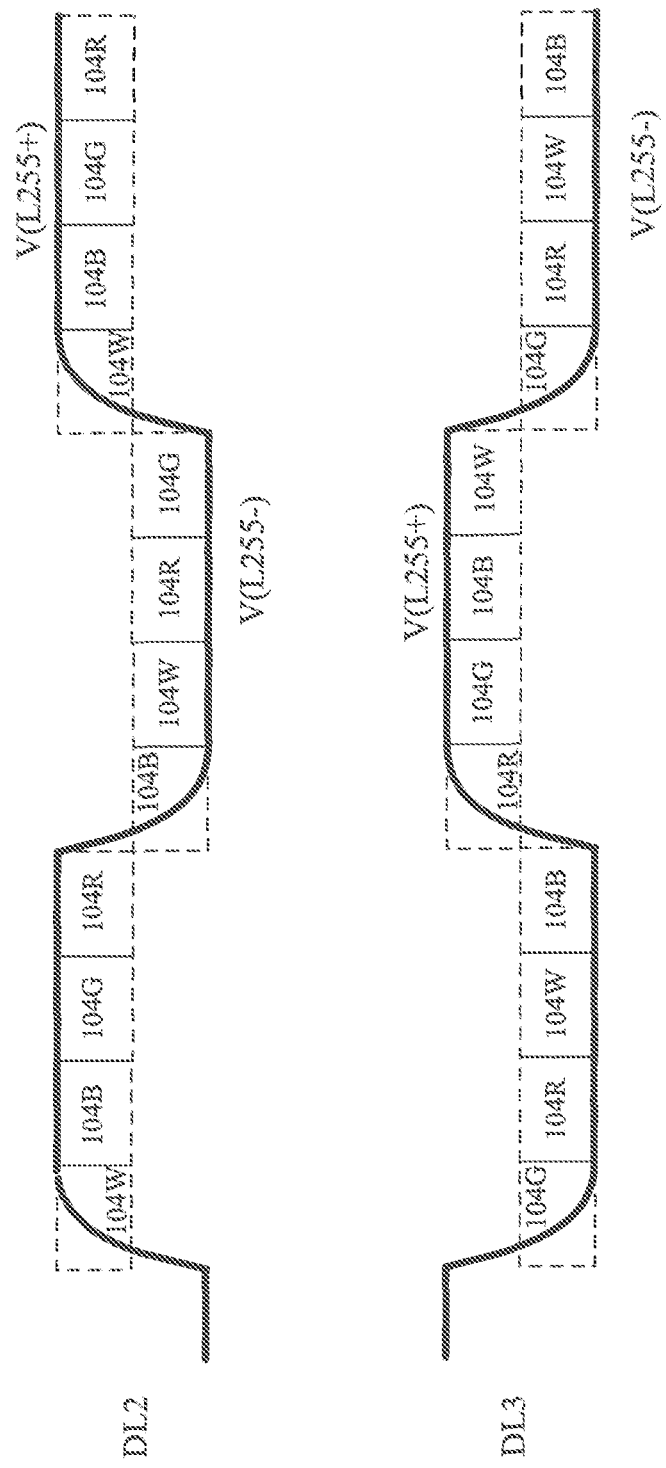
FIG. 1B is a schematic drive timing waveform of data lines on the array substrate according to the first embodiment of the present invention.

Please refer to FIGS. 1A and 1B. FIG. 1A is a schematic circuit of an array substrate of an LCD according to a first embodiment of the present invention. FIG. 1B is a schematic drive timing waveform of data lines DL on the array substrate according to the first embodiment of the present invention. The drive timing waveform represents a charging timing waveform. The array substrate is used in an LCD panel and comprises a gate driver 100, a source driver 102 and a plurality of scan lines, e.g. GL1 to GL10, a plurality of data lines, e.g. DL1 to DL5, and sub-pixels 104W, 104B, 104G, 104R. It should be noted that the amount of scan lines and data lines are not limited and may be more scan lines and data lines.

In FIGS. 1A and 1B, the scan lines GL1 to GL10 are electrically coupled to the source driver 100 for correspondingly receiving a scan signal of the scan driver 100 wherein the scan lines GL1 to GL10 comprise a plurality of odd scan lines and even scan lines which are sequentially arranged. The data lines DL1 to DL5 are electrically coupled to the source driver 102 for correspondingly receiving data signals of the source driver 102 wherein the data lines DL1 to DL5 comprise a plurality of odd data lines and even data lines which are sequentially arranged.

The scan lines GL1 to GL10 and the data lines DL1 to DL5 are insulatedly interlaced in an array with a column and row arrangement to form a plurality of pixel regions 104a. Each pixel region 104a comprises a data line (one of DL1 to DL5) and at least two scan lines, e.g. scan lines GL1 to GL4. Each pixel region 104a is composed of four sub-pixels 104W, 104B, 104G, 104R with different color types correspondingly. The drive polarities of sub-pixels 104W, 104B, 104G, 104R with the same color type which are disposed in different pixel regions 104a comprises positive polarity, e.g. level "V(L255+)" and negative polarity level "V(L255−)" based on the data signals. In one embodiment, the pixel region 104a includes four sub-pixels 104W, 104B, 104G, 104R with different color types which are a white sub-pixel, a blue sub-pixel, a green sub-pixel and a red sub-pixel respectively.

As shown in FIGS. 1A and 1B, the array substrate utilizes a dot-inversion manner with four horizontal period (4H) and the charging sequence of the sub-pixels is changed in every four sub-pixels at a time wherein the four sub-pixels comprises four different color types. For an example of the data line DL2, four sub-pixels are first charged by the data line DL2 in one drive polarity, i.e. positive or negative polarity, and next four sub-pixels are charged by the data line DL2 in another drive polarity, i.e. negative or positive polarity. In other words, the drive polarity of the sub-pixels is changed in every four sub-pixels at a time. In this case, one half of all the sub-pixels 104W, 104B, 104G, 104R are charged in a negative polarity and the other half are charged in a negative polarity within the whole display panel during a display moment. At one regular frame interval, the positive and negative drive polarities of all the sub-pixels 104W, 104B, 104G, 104R are inverted respectively in order to solve the problem of blinking phenomenon due to the dot-inversion of drive polarity of sub-pixels. In one embodiment, the odd data line, e.g. DL3, and even data line, e.g. DL2, are triggered by the identical scan lines, e.g. GL1 to GL10, the drive polarities of the pixel region in the odd data line, e.g. DL3, are opposite to the drive polarities of the pixel region in the even data line, e.g. DL2.

As shown in FIGS. 1A and 1B, when the display panel is operated, for an example of data line DL2 which is the same driving manner of the even data lines, e.g. data lines DL2 and DL4 are the same as DL2, the charging sequence of the four sub-pixels with a positive polarity is sub-pixel 104W, sub-pixel 104B, sub-pixel 104G, and sub-pixel 104R. When the time delay of the data signal exists, the charging status of the sub-pixel 104W is decreased, i.e. a temporary response, and the charging statuses of another three sub-pixels 104B, 104G and 104R are better. For the next four sub-pixels in DL2, the charging sequence of the four sub-pixels with a negative polarity is sub-pixel 104B, sub-pixel 104W, sub-pixel 104R, and sub-pixel 104G. When the time delay of the data signal exists, the charging status of the sub-pixel 104B is decreased, i.e. a temporary response, and the charging statuses of another three sub-pixels 104W, 104R and 104G are better. The source driver's fanout, e.g lateral sides and corners of the panel, has high impedance within the display panel wherein the charging status in a quarter of sub-pixels, i.e. sub-pixels 104B or 104W, is decreased and the charging statuses in another three quarters of sub-pixels are better. For an example of data line DL3 which is the same driving manner of the odd data lines, e.g. data lines DL1 and DL5 are the same as DL3, the charging sequence of the four sub-pixels is sub-pixel 104G, sub-pixel 104R, sub-pixel 104W, sub-pixel 104B, sub-pixel 104R, sub-pixel 104G, sub-pixel 104B, and sub-pixel 104W wherein the charging status in a quarter of sub-pixels, i.e. sub-pixels 104G or 104R, is decreased and the charging statuses in another three quarters of sub-pixels are better.

In view of whole display panel, since the sub-pixel 104W, each of the sub-pixel 104B, sub-pixel 104G, and sub-pixel 104R has a quarter of decreased charging status and three quarters of better charging statuses, therefore, the charging statuses of the sub-pixels 104W, sub-pixels 104B, sub-pixels 104G, and sub-pixels 104R are uniform after the sub-pixels 104W, 104B, 104G and 104R are mixed, thereby solving the problems of the color deviation in the two lateral fanout sides of the LCD panel.

These sub-pixels 104W, 104B, 104G, 104R are electrically coupled to the scan lines GL and data lines DL. Each of the sub-pixels 104W, 104B, 104G, 104R has a transistor 108, a liquid-crystal capacitor (CLC) and a storage capacitor (CS) wherein the transistor 108 has a gate electrode G, a source electrode S and a drain electrode D. The gate electrode G is connected to the scan line GL, the source electrode S is connected to the data line DL, and the drain electrode D is commonly connected to the CLC and the CS (not shown) or commonly connected to the common line (not shown). When a positive voltage is applied to the scan line GL, the thin film transistor 108 connected to the scan line turns on so that the sub-pixel electrodes of the CLC are electrically connected to the data lines DL and the video signal is transmitted to the sub-pixel electrode via the data lines correspondingly for charging the CLC to be a proper voltage level. In other words, the CLC of the sub-pixel is charged to drive the liquid crystal molecules within the liquid crystal layer for displaying the image on the LCD panel. Meanwhile, the CSs connected to the data lines DL are charged wherein the charged CSs are used to maintain the voltage potential of the CLC to be a predetermined value for keeping the voltage potential to be constant in the both terminals of the CLC by the charged CSs before the data lines are updated.

In FIGS. 1A and 1B, when one pixel region 104a in an odd data line, e.g. DL3, corresponds to another pixel region 104a in an even data line, e.g. DL2, which are triggered by the same scan lines, the charging sequence of the sub-pixels 104W, 104B, 104G and 104R of the one pixel region 104a in the odd data line is different from that of the sub-pixels 104W, 104B, 104G and 104R of the another pixel region 104a of in the even data line. Preferably, the charging sequence of the sub-pixels 104W, 104B, 104G and 104R of the one pixel region 104a in one data line, e.g. DL2, is different from that of the sub-pixels 104W, 104B, 104G and 104R of the another pixel region 104a adjacent to the one pixel region 104a in the one data line, i.e. DL2. When the odd data line, e.g. DL3 and the even data line, e.g. DL2, are triggered by a plurality of identical scan lines, the drive polarity of the pixel region 104a in the odd data line DL3 is opposite to that of the pixel region 104a in the even data line DL2.

Figure 2A:
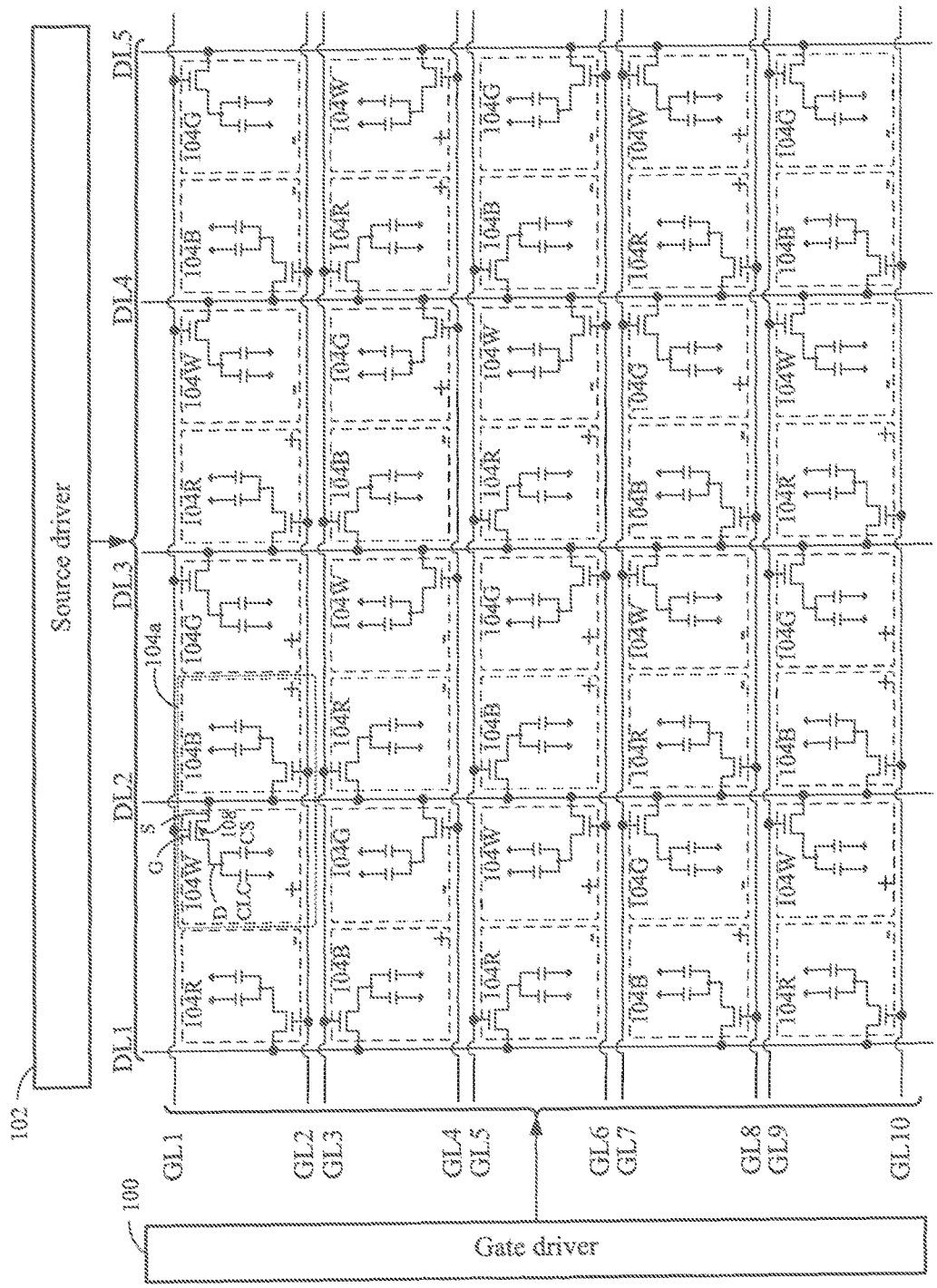
FIG. 2A is a schematic circuit of an array substrate of an LCD according to a second embodiment of the present invention.
Figure 2B:
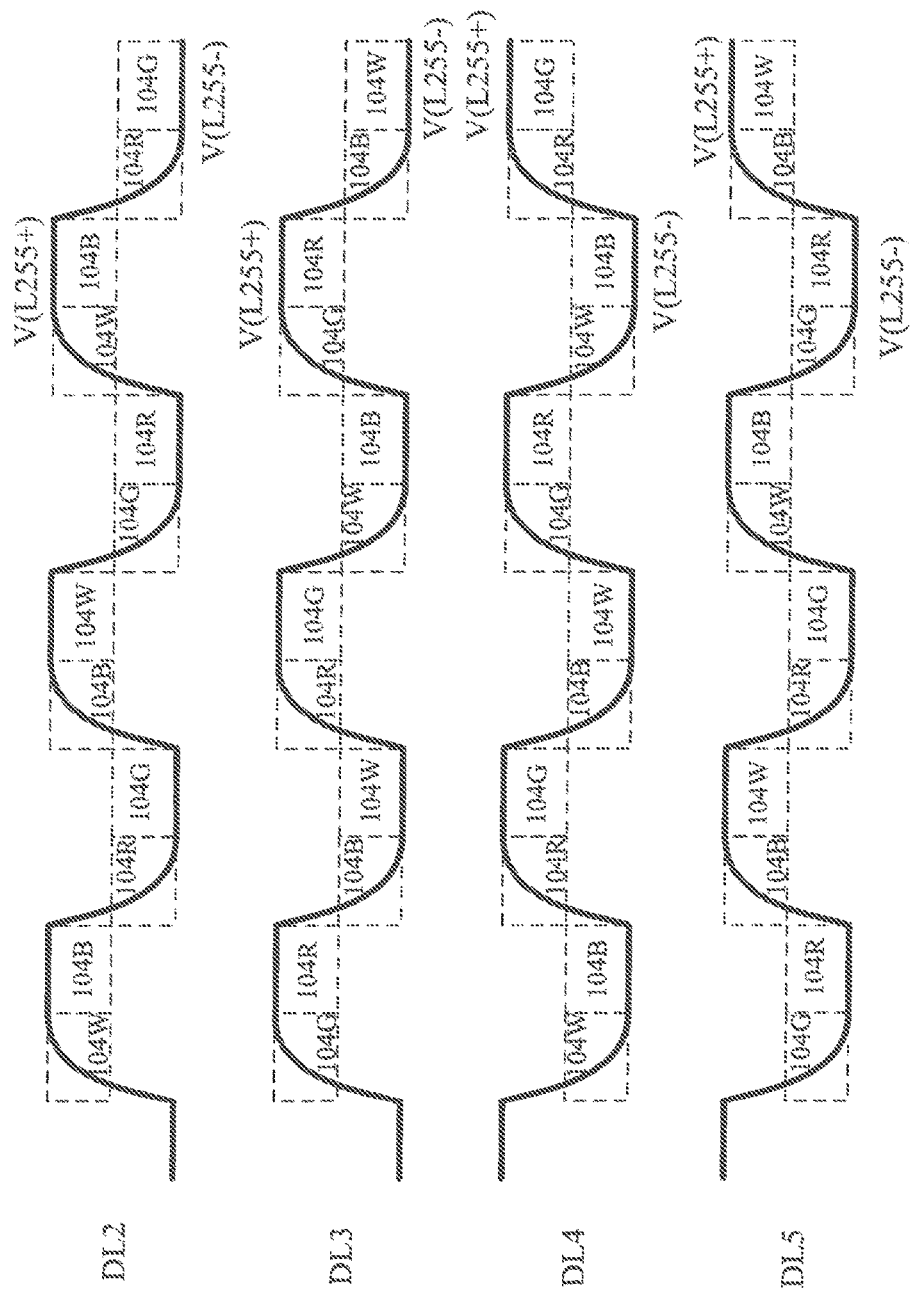
FIG. 2B is a schematic drive timing waveform of data lines on the array substrate according to the second embodiment of the present invention.

Please refer to FIGS. 2A and 2B. FIG. 2A is a schematic circuit of an array substrate of an LCD according to a second embodiment of the present invention. FIG. 2B is a schematic drive timing waveform of data lines on the array substrate according to the second embodiment of the present invention. The array substrate utilizes a dot-inversion manner with two horizontal period (2H) and the charging sequence of the sub-pixels is changed in every two sub-pixels at a time according to the second embodiment. In FIG. 1A, the drive polarity of the sub-pixels is changed in one spaced data line apart, i.e. two adjacent data lines, at a time. In FIG. 2A, the drive polarities, i.e. positive and negative polarities, of each sub-pixel with different color type is one half respectively within the whole display panel during a display moment in order to solve the problem of blinking phenomenon. For example, the white sub-pixels 104B with positive polarity are one half and the white sub-pixels 104B with negative polarity is the other half in view of all the white sub-pixels 104B. In one embodiment, the pixel region 104a includes two sub-pixels with two different color types respectively, e.g. a pair of sub-pixels 104W and 104B or a pair of sub-pixels 104G and 104R. The two sub-pixels with two different color types includes a pair of white sub-pixel 104W and blue sub-pixel 104B or a pair of green sub-pixel 104G and red sub-pixel 104R. When the even data line, e.g. DL2 and the odd data line, e.g. DL3 are triggered by a plurality of identical scan lines, the drive polarity of the pixel region 104a in the even data line DL2 is the same as that of the pixel region 104a in the odd data line DL3. In another embodiment, when the odd data line, e.g. DL3 and the even data line, e.g. DL4, are triggered by a plurality of identical scan lines, the drive polarity of the pixel region 104a in the odd data line DL3 is opposite to that of the pixel region 104a in the even data line DL4.

FIG. 2B is a schematic drive timing waveform of data lines on the array substrate in FIG. 2A wherein the charging sequence of sub-pixels in the data line DL2 is the same as that of sub-pixels in the data line DL4 but their drive polarities are opposite. For an example of data line DL2, the sub-pixel 104W is charged in the first positive polarity (in the left side), e.g. gray level V(L255+), and the charging status of sub-pixel 104W is decreased. The sub-pixel 104R is charged in the first negative polarity, e.g. gray level V(L255−), and the charging status of sub-pixel 104R is decreased. The sub-pixel 104B is charged in the second positive polarity (in the central portion), e.g. gray level V(L255+), and the charging status of sub-pixel 104B is decreased. The sub-pixel 104G is charged in the second negative polarity, e.g. gray level V(L255−), and the charging status of sub-pixel 104G is decreased. Furthermore, the sub-pixel 104B is charged in the first positive polarity (in the left side), e.g. gray level V(L255+), and the charging status of sub-pixel 104W is better. The sub-pixel 104G is charged in the first negative polarity, e.g. gray level V(L255−), and the charging status of sub-pixel 104G is better. The sub-pixel 104W is charged in the second positive polarity (in the central portion), e.g. gray level V(L255+), and the charging status of sub-pixel 104W is better. The sub-pixel 104R is charged in the second negative polarity, e.g. gray level V(L255−), and the charging status of sub-pixel 104R is decreased. Thus, in view of one data line DL2, the charging status in one half of sub-pixel 104W, sub-pixel 104R, sub-pixel 104G, or sub-pixel 104B is decreased and the charging status in the other half of sub-pixel 104W, sub-pixel 104R, sub-pixel 104G, or sub-pixel 104B is better. Therefore, the whole color-mixed effect of all the bus-pixels with different color types is uniform, thereby solving the problem of color deviation in the lateral sides of the source driver's fanout. Similarly, the data lines DL3 to DL5 has the same effect as the data line DL2 except the difference of drive polarities and charging sequence.

Figure 3A:
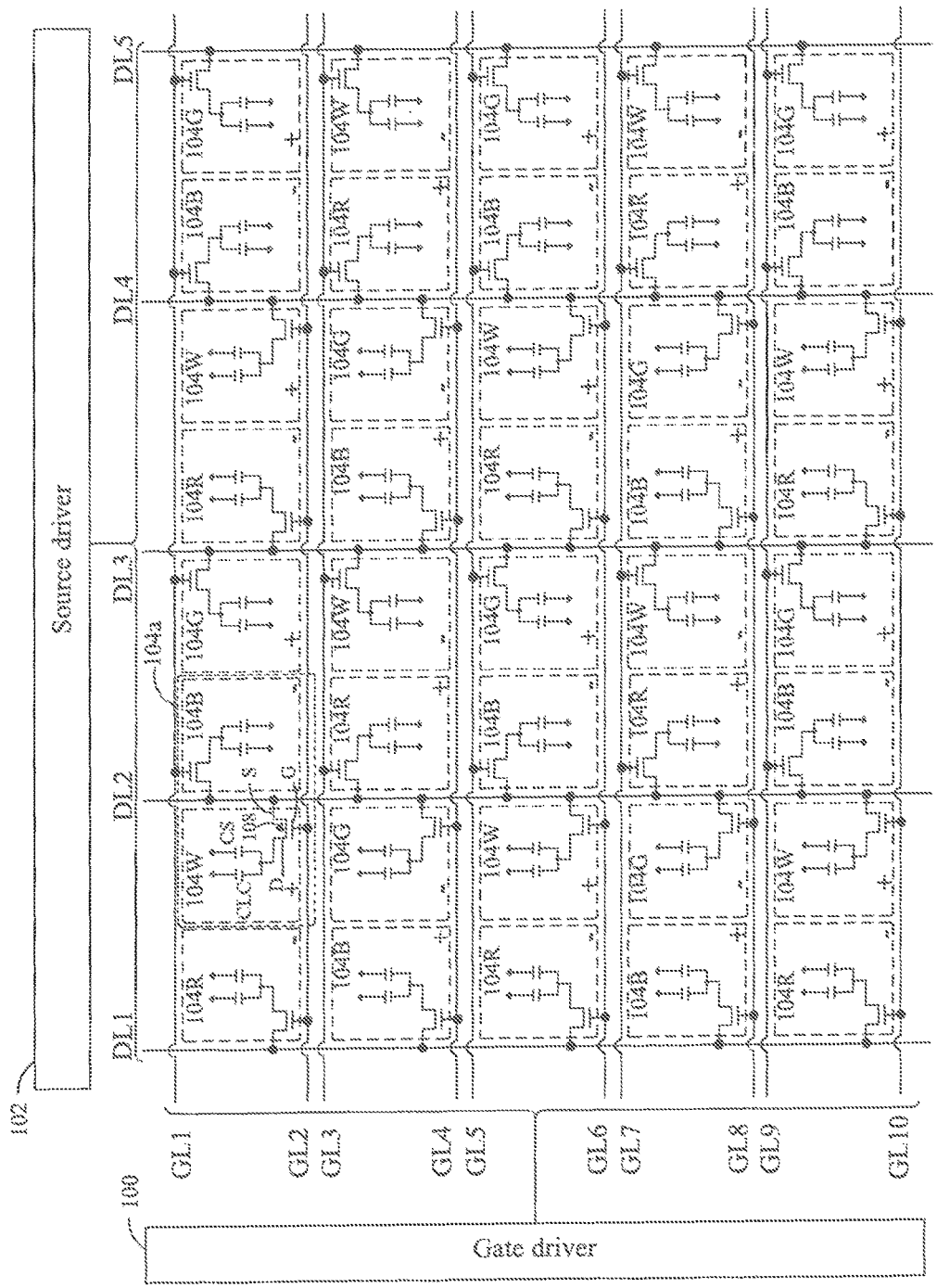
FIG. 3A is a schematic circuit of an array substrate of an LCD according to a third embodiment of the present invention.
Figure 3B:
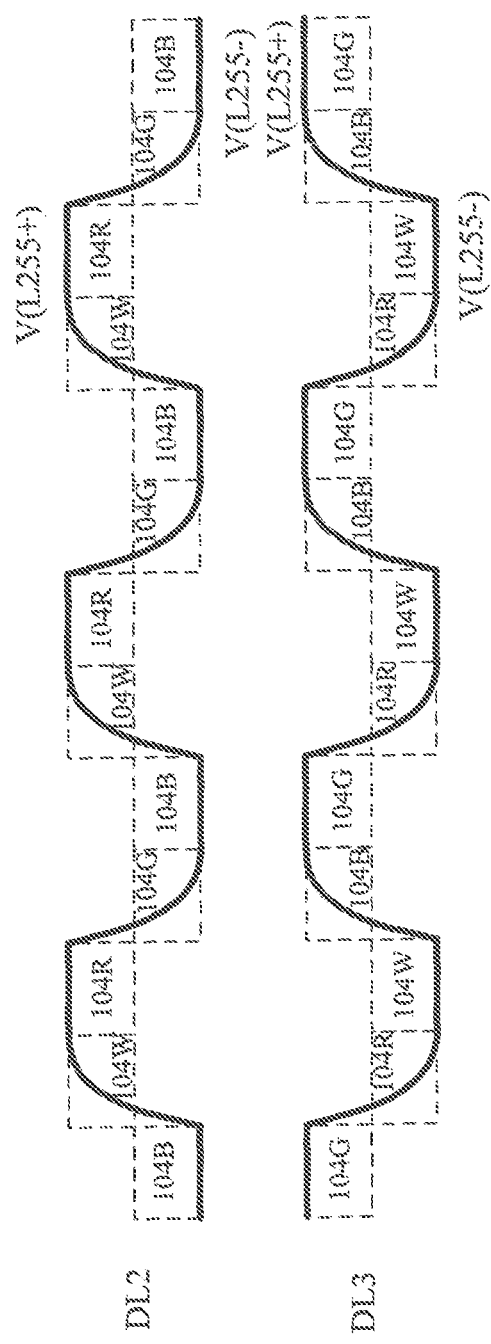
FIG. 3B is a schematic drive timing waveform of data lines on the array substrate according to the third embodiment of the present invention.

Please refer to FIGS. 3A and 3B. FIG. 3A is a schematic circuit of an array substrate of an LCD according to a third embodiment of the present invention. FIG. 3B is a schematic drive timing waveform of data lines on the array substrate according to the third embodiment of the present invention. FIG. 3B is a schematic drive timing waveform of data lines DL2, DL3 on the array substrate in FIG. 3A, which is similar to the first and second embodiments. Thus, in view of one frame of the whole display panel, the charging status in one half of sub-pixels is decreased and the charging status in the other half of sub-pixels is better. Therefore, the whole color-mixed effect of all the bus-pixels with different color types is uniform, thereby solving the problem of color deviation in the lateral sides of the source driver's fanout area. Moreover, the drive polarities, i.e. positive (V(L255+) and negative (V(L255−) polarities, of each sub-pixel with different color type is one half respectively within the whole display panel during a display moment in order to solve the problem of blinking phenomenon in the lateral sides of the source driver's fanout area.

In one embodiment, the pixel region 104a includes two sub-pixels with two different color types respectively, e.g. a pair of sub-pixels 104W and 104B or a pair of sub-pixels 104G and 104R. The two sub-pixels with two different color types includes a pair of white sub-pixel 104W and blue sub-pixel 104B or a pair of green sub-pixel 104G and red sub-pixel 104R. In another embodiment, when the odd data line, e.g. DL3 and the even data line, e.g. DL2, are triggered by a plurality of identical scan lines, the drive polarity of the pixel region 104a in the odd data line DL3 is opposite to that of the pixel region 104a in the even data line DL2.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. An array substrate with a data line sharing structure used in a liquid crystal display (LCD) wherein the array substrate connected to a gate driver, the array substrate comprising:
    a scan driver;
    a plurality of scan lines electrically coupled to the scan driver for correspondingly receiving a scan signal of the scan driver wherein the scan lines comprise a plurality of odd scan lines and a plurality of even scan lines which are sequentially arranged; and
    a plurality of data lines electrically coupled to the scan driver for correspondingly receiving a data signal of the scan driver wherein the data lines comprise a plurality of odd data lines and a plurality of even data lines which are sequentially arranged;
    wherein the scan lines and the data lines are insulatedly interlaced in an array with a column and row arrangement to form a plurality of pixel regions, each pixel region comprises a data line and at least two scan lines, each pixel region is composed of a plurality of sub-pixels with different color types correspondingly, and a plurality of drive polarities of the sub-pixels with the same color types, which are disposed in different pixel regions, comprises a positive polarity and a negative polarity based on the data signal;
    wherein when first pixel region in an odd data line corresponds to second pixel region in an even data line, which are triggered by the same scan lines, the charging sequence of the sub-pixels of the one pixel region in the odd data line is different from that of the sub-pixels of the another pixel region of in the even data line.

2. The array substrate of claim 1, wherein a charging sequence of the sub-pixels of first pixel region in one data line is different from the charging sequence of the sub-pixels of second pixel region adjacent to the first pixel region in the one data line.

3. The array substrate of claim 2, wherein each pixel region is composed of two sub-pixels with different color types respectively.

4. The array substrate of claim 3, wherein the two sub-pixels with different color types comprise a pair of white sub-pixel and a blue sub-pixel or a pair of green sub-pixel and red sub-pixel.

5. The array substrate of claim 4, wherein when the odd data line and the even data line are triggered by a plurality of identical scan lines, the drive polarity of the first pixel region in the odd data line is the same as that of the second pixel region in the even data line.

6. The array substrate of claim 4, wherein when the odd data line and the even data line are triggered by a plurality of identical scan lines, the drive polarity of the first pixel region in the odd data line is opposite to that of the second pixel region in the even data line.

7. The array substrate of claim 3, wherein when the odd data line and the even data line are triggered by a plurality of identical scan lines, the drive polarity of the first pixel region in the odd data line is opposite to that of the second pixel region in the even data line.

8. The array substrate of claim 2, wherein the pixel region comprises four sub-pixels with different color types which are composed of a white sub-pixel, a blue sub-pixel, a green sub-pixel and a red sub-pixel respectively.

9. The array substrate of claim 8, wherein when the odd data line and the even data line are triggered by a plurality of identical scan lines, the drive polarity of the first pixel region in the odd data line is opposite to that of the second pixel region in the even data line.

* * * * *